INVENTOR.
BARRIE BRIGHTMAN
BY Hoffman Stone
ATTORNEY

INVENTOR.
BARRIE BRIGHTMAN
BY
[signature]
ATTORNEY 3,445,606

MULTIFREQUENCY DETECTION SYSTEM INCLUDING A FREQUENCY MULTIPLYING CIRCUIT

Barrie Brightman, Webster, N.Y., assignor to Stromberg-Carlson Corporation, Rochester, N.Y., a corporation of Delaware Filed Mar. 21, 1966, Ser. No. 535,828
Int. Cl. H04j 3/18
U.S. Cl. 179—84 5 Claims

ABSTRACT OF THE DISCLOSURE

In a time division multiplex system, a multifrequency signal detection system wherein incoming signals are time compressed before they are evaluated. This process multiplies their frequencies, thereby allowing the frequency detector to be constructed of physically smaller components.

This invention relates to a novel system for analyzing signals such as those used in so-called touch-tone telephone systems in place of the older dialing pulses to actuate the switching system in an automatic switchboard or telephone exchange, and, more particularly, to a system of this type which enables a single detector to be shared on a sequential basis by plural lines.

Touch-tone dialing systems are being installed in increasing numbers. They have many advantages, particularly with regard to speed of action relative to the relatively slow telephone dial. Touch-tone systems are commonly based upon a combination of tones. Each push button in the array on the telephone handset ordinarily energizes two oscillators when it is actuated. The first oscillator is arranged to oscillate at a selected one of three frequencies, and the second oscillator is set to oscillate at a selected one of four different frequencies in response to actuation of any particular push button. The signals produced by pushing the buttons therefor are composed each of two sine waves of different frequencies, which are detected at the switchboard or central office by an array of filters to energize the control equipment. Because of the band pass limitation of ordinary telephone lines, the signal frequencies transmitted are necessarily in the ordinary voice range, usually below about 5000 c.p.s., and relatively bulky filters are required. Moreover, a full complement of filters has heretofore been required for each ringing channel through the switchboard or central office.

The present invention is directed to means for reducing the equipment required for processing touch-tone signals, enabling the simultaneous detection of touch-tone signals from all ringing channels by a single set of filters, and this single set being of much more compact and less expensive construction than the filter sets heretofore required.

The invention will now be described in greater detail in connection with the accompanying drawings, in which.

Briefly, in its broadest aspect, the invention contemplates time-compressing the touch-tone signals received at the switchboard or central exchange thereby to increase the frequencies of its components, and then producing an output signal to indicate the presence of a component of predetermined frequency in the compressed signal, the predetermined frequency being higher in proportion to the compression than the identifying component in the original signal. Thus, the frequency detector of the system is tuned to frequencies higher than those included in the original touch-tone signals, and may, accordingly, be of smaller physical size than heretofore proposed. Moreover, the detector in the practice of the invention may serve several ringing channels simultaneously on a sequential, time-sharing basis, thereby achieving still further economy of construction.

In a somewhat narrower sense, the invention contemplates the provision of a small number of ringing channels, or circuits, in a telephone exchange which includes a large number of line circuits, means for selectively directing signals from selected ones of the line circuits to selected ones of the channels, time-compression means in each channel for compressing signals and thereby increasing the frequencies of their Fourier components, a multifrequency signal detector for producing output signals responsively to signal components of predetermined frequencies, and time-sharing means for directing the compressed signals from the channels to the multifrequency signal detector in sequence. Thus, a single multifrequency signal detector is enabled to serve plural ringing channels.

The embodiment of the invention described herein is arranged for use in a time division multiplex (TDM) system, and includes delay line storage devices for compressing the signals. It will be understood, however, that the invention is also applicable to systems of other types, and that signal compression may be accomplished by devices other than the delay lines shown such as, for example, by a magnetic storage device.

Figure 1:
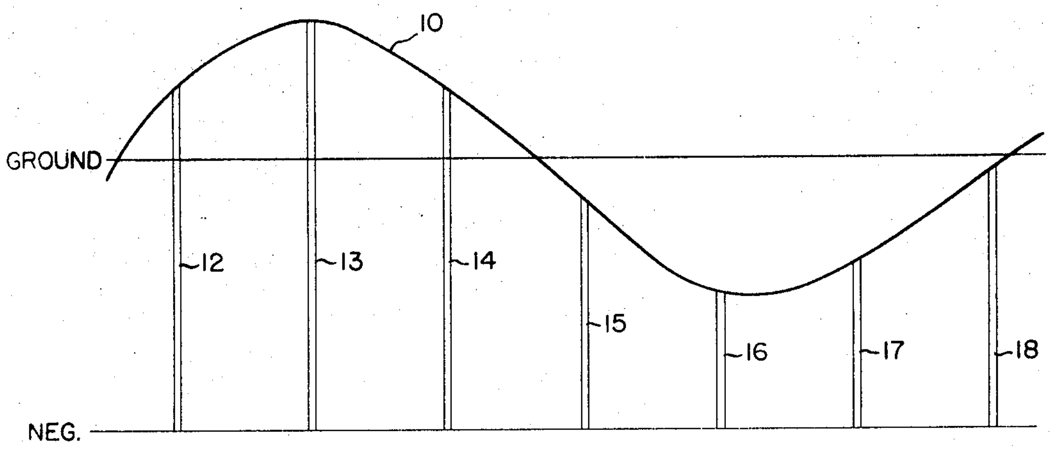
FIG. 1 is a schematic chart illustrating time division sampling of a sine wave signal.
Figure 2:
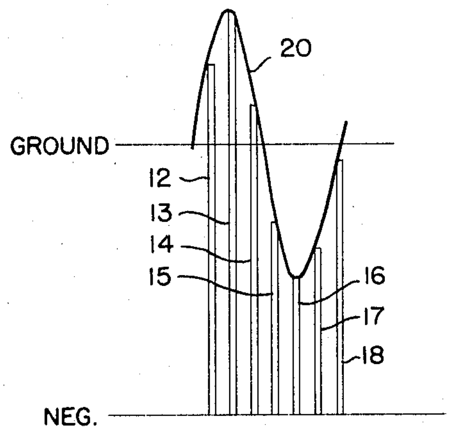
FIG. 2 is a schematic chart illustrating the frequency multiplying, or time compressing effect utilized in the practice of the invention.
Figure 3:
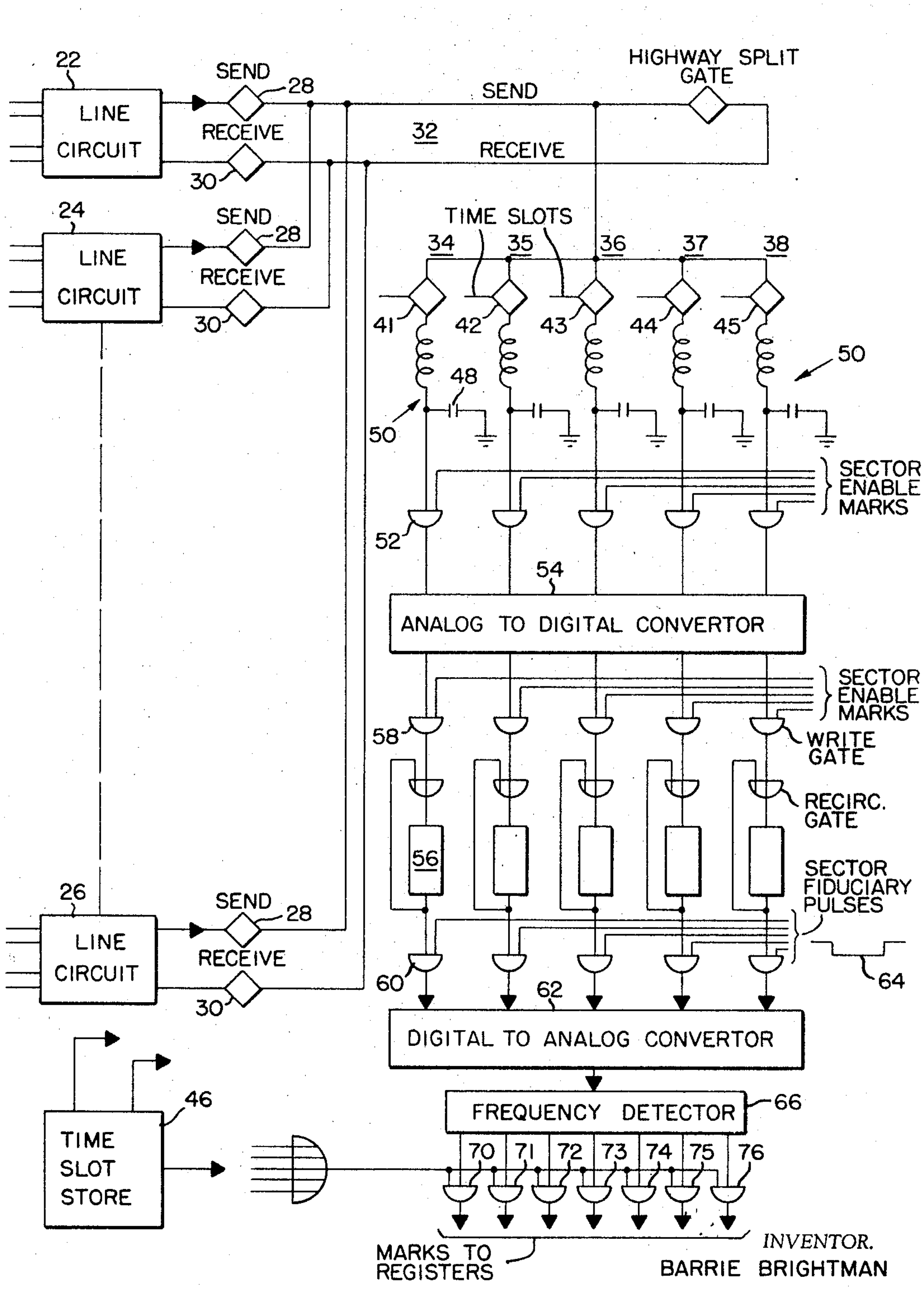
FIG. 3 is a block diagram of a signal analyzing circuit according to a presently preferred embodiment of the invention.

Referring now to the drawings, FIGS. 1 and 2 illustrate the time-compression principle employed in the presently preferred embodiment of the invention. This principle was also described in Technical Memorandum No. 37, "The Deltic Correlator," by Victor C. Anderson, Jan. 5, 1956, describing work done at the Acoustics Research Laboratory at Harvard University under the Office of Naval Research contract M 50 RI–76. In accordance with this principle the signal such as the sine wave signal 10 shown by way of example is sampled according to TDM techniques during time spaced periods of predetermined duration, commonly 0.4 microsecond periods, which, taken with adjoining 0.6 microsecond guard periods are called slots, beginning at 100 microsecond intervals. The resulting pulses 12–18 are preferably converted to digital form, as will be described hereinafter, but the principle may be more readily understood by reference only to the amplitude modulated pulses 12–18. These pulses are fed into a recirculating delay line that has a capacity smaller by one unit than the capacity of the sampling device.

For example, for one microsecond slots spaced at 100 microsecond intervals, the capacity of the sampling system is 100 channels, and the delay line would have a 99 microsecond delay. Thus, when the second pulse 13 occurs, the first pulse 12 has passed through the delay line once, been reinserted, and progressed 1 microsecond on its second transit. The second pulse 13 enters the delay line 1 microsecond behind the first pulse. As the process goes on, each successive pulse enters the delay line only 1 microsecond behind the preceding one, and the signal finally circulating in the line is the same series of pulses (FIG. 2) produced by the initial sampling but spaced at 1 microsecond intervals instead of 100 microsecond intervals.

When the pulses 12–18 are thereafter demodulated, the Fourier components of the output signal 20 are multiples of the components of the input signal 10 by a factor equal to the ratio between the sampling intervals. Using the numbers given by way of example, the frequency multiplication would be 100, so that, for example, a 5 kilocycle input signal would be converted to a 500 kilocycle output signal.

The output signals from the delay lines are gated into a common multifrequency signal detector in sequence as controlled by sector fiduciary pulses. To synchronize the inputs to the delay lines with the fiduciary pulses, which gate their outputs, it is necessary to gate the inputs in relation to the fiduciary pulses, and independently of the pulses from the time slot store. Therefore, the signals received from the TDM highway through the sector gates are stored until they are gated into the delay lines.

Because of the nature of the delay lines it is preferable to convert the amplitude modulated pulse signals (analog signals) to digital form for insertion into the lines. The digital output of the lines is then reconverted to analog form for delivery to the detector.

In the arrangement shown, the exchange or switchboard includes plural line circuits 22, 24 and 26, only three of which are shown, but which would probably number up to sixty-four in a switchboard and up to several thousand in a telephone exchange. All of the line circuits 22, 24 and 26 are connected to the TDM highway through the conventional send and receive gates 28 and 30. The send side of the highway 32 is connected to a number of channels, or sectors 34, 35, 36, 37 and 38 (typically five for a switchboard) through sector gates 41, 42, 43, 44 and 45, respectively, which are operated responsively to the time slot pulses from the multifraquency detector time slot store. Thus, the time slot store, through its associated logic, assigns a given time slot to a calling line and also to an idle one of the sectors 34–38 for the duration of the signalling period.

A pulse from the highway 32 enters its assignel sector, for example, the first sector 34, through the associated sector gate 41, and is stored on the capacitor 48 in the resonant transfer storage device 50 until the insertion gate 52 in the sector is opened by the appropriate sector enable mark. The sector enable marks are pulses of preferably substantially the same duration as the sampling periods of the time slots, typically about 0.4 microsecond, in order to insure adequate pulse separation in the delay lines.

The charge from the caacitor 48, which is proportional in magnitude to the sampled pulse delivered to it, passes through the gate 52 and is converted to a digital signal by the analog-to-digital convertor 54 for insertion into the delay line 56. In the example shown, delta modulation would be the preferred digital form, and only a single delay line is required for each sector 34–38. If it is desired to use pulse code modulation, a separate delay line would be required in each sector for each weighted value of the code.

The output of the convertor 54 is inserted into the delay line 56 through a write gate 58, which is also controlled by the sector enabling marks.

As the last signal pulse in the predetermined group of sample pulses is admitted to the delay line, the signal stored in the delay line 56, now in time-compressed form, is fed through an output gate 60 into a digital to analog convertor 62 under the control of sector fiduciary pulses 64. The digital to analog convertor 62 generates an analog signal, demodulates it, and feeds it to the frequency detector 66 for analysis. The output of the detector 66 is fed through synchronizing gates 70–76 to the mark registers (not shown) under control of the time slot pulses from the time slot store of the multi-frequency signal detector system.

The fiduciary pulses are of sufficient duration to allow the entire series of stored pulses to pass from the delay line 56 to the convertor 62. In cases where a particular sector is assigned to a time slot that occurs close to the leading edge of the fiduciary pulse 64, it may occur that there is not enough time for the frequency detector 66 to produce a recognizable output signal before the time slot closes. In these cases, the control circuit is arranged to apply two or more successive fiduciary pulses 64 to the particular sector, and to allow the signal to recirculate a corresponding number of additional times through the delay line 56, thereby assuring adequate output signal to operate the registers.

Ordinarily, in the practice of the invention, the sector enable marks are synchronized with the time slots from the time slot store, and the fiduciary pulses are equal in duration to the intervals between successive sampling pulses in the same time slot. Thus, the operation of the signal detection circuit of the invention is synchronized with the operation of the over all TDM system.

What is claimed is:

1. A telephone signalling system of the multifrequency signal type in which it is desired to analyze a signal to ascertain whether it includes a component of a predetermined frequency comprising means for time-compressing the signal thereby to increase the frequency of all its components, and a detector for producing an output signal responsively to the presence in the compressed signal of a component of a frequency higher than the predetermined frequency by a factor proportional to the time compression.

2. A telephone signal recognition system of the multifrequency signal detection type for use in a telephone exchange having plural line circuits comprising means defining a number of signal channels less than the number of line circuits, means for selectively directing signals from selected ones of the line circuits to selected ones of said channels, means in said channels for time-compressing signals therein thereby to increase the frequencies of the Fourier components of the signals, a multifrequency signal detector for detecting selected components of signals so compressed, and time sharing means for sequentially directing compressed signals from said channels to said detector.

3. A signalling system according to claim 1 in which said time-compressing means comprises time division means for periodically sampling an input signal for periods of predetermined duration at predetermined intervals, each of said intervals being long enough to encompass a plurality of said periods, a recirculating delay line having a delay shorter by one period than the duration of one of said intervals, and means for inserting samples of a selected signal successively into said delay line.

4. A signalling system in accordance with claim 3 wherein the input signal is an amplitude modulated signal, and the samples produced by said time division means are in the form of amplitude modulated pulses, said system including analog to digital convertor means for converting the samples produced by said time division means to digital form for insertion into said delay line, and a digital to analog convertor for converting the output of said delay line to analog form for delivery to said detector.

5. A signal recognition system of the multifrequency signal detection type for use in a telephone exchange or the like of the time division multiplex type comprising:

(a) plural ringing channels smaller in number than the line capacity of the exchange, (b) synchronizing means for selectively assigning said channels to the same time slots as selected ones of the lines, (c) each one of said channels including a recirculating delay line characterized by a delay one time slot shorter than the number of time slots in the repetitive pattern of the time division multiplex system of the exchange, (d) each of said channels including storage means for storing time slot signals, (e) synchronizing means synchronized with the timing of the time division multiplex system for directing signals from said storage means into said delay lines in the form of signals of substantially the same duration as the time slot signals, (f) a frequency detector for detecting Fourier signal components at frequencies higher than the signal frequencies observable in the lines, and (g) gating means for directing signals stored in said delay lines to said frequency detector, said gating means being arranged to connect each of said delay lines in predetermined sequence to said detector for times sufficient for said detector to produce an output signal receivable by the registers of the exchange.

No references cited.

KATHLEEN H. CLAFFY, *Primary Examiner.*

W. A. HELVESTINE, *Assistant Examiner.*

U.S. Cl. X.R.

179—15.55, 18